United States Patent
Widmer et al.

(10) Patent No.: US 6,474,271 B1
(45) Date of Patent: Nov. 5, 2002

(54) METHOD AND APPARATUS FOR REDUCING EMISSION OF NITROGEN OXIDES FROM A COMBUSTION SYSTEM

(75) Inventors: Neil Colin Widmer, San Clemente; Roy Payne, Mission Viejo; Antonio Marquez, Tustin; Larry William Swanson, Laguna Hills; Philippe J. Gauthier, Fullerton, all of CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/842,322

(22) Filed: Apr. 26, 2001

(51) Int. Cl.$^7$ .................................. F22B 37/56

(52) U.S. Cl. .................. 122/405; 60/282; 422/172; 423/235

(58) Field of Search .................. 122/4 D, 7 R, 122/405, 443; 60/276, 282, 286; 422/172; 110/245; 239/533.1; 423/235

(56) References Cited

U.S. PATENT DOCUMENTS

| | | | |
|---|---|---|---|
| 4,115,515 A | | 9/1978 | Tenner et al. |
| 5,555,718 A | * | 9/1996 | Anderson et al. ......... 60/39.182 |
| 6,019,068 A | | 2/2000 | Tsuo et al. |
| 6,048,510 A | * | 4/2000 | Zauderer ............. 423/235 |
| 6,162,409 A | * | 12/2000 | Skelley et al. ............ 423/235 |
| 6,280,695 B1 | * | 8/2001 | Lissianski et al. .......... 110/345 |
| 6,284,022 B1 | * | 9/2001 | Sachweh et al. ............ 95/149 |

OTHER PUBLICATIONS

"Fluidic Sprays," S. Raghu et al.; Eighth International Conference on Liquid Atomization and Spray Systems, Pasadena, California, Jul. 2000.

"Using Pulsed Sprays from Oversized Orifices to Increase Momentum and Kinetic Energy in Depositing Agricultural Sprays," D. K. Giles et al.; Eighth International conference on Liquid Atomization and Spray Systems, Pasadena, California, Jul. 2000.

"Influence of Fluid Properties on Mono–Size Droplet Generation," Wei–Hsiang Lai et al.; Eighth International Conference on Liquid Atomization and Spray Systems, Pasadena, California, Jul. 2000.

"Control of Drop Size by Rheology, " V. Romagnoli et al.; Eighth International Conference on Liquid Atomization and Spray Systems, Pasadena, California, Jul. 2000.

"Controlling the Breakup of a Liquid Jet," B. A. Strayer et al.; Eighth International Conference on Liquid Atomization and Spray Systems, Pasadena, California, Jul. 2000.

"Production of Droplets of Uniform Size by Vibration," Araki et al., Fuel Society of Japan, $1^{st}$ International Conference on Liquid Atomization and Spray Systems, Tokyo, Japan, Aug. 27–31, 1978.

"Production of Monodisperse Sprays," Dabora, The Review of Scientific Instruments, vol. 38, No. 4, Apr. 1967.

"Monodisperse Atomization Systems for Pesticide Sprays," Yates et al., Fuel Society of Japan, $1^{st}$ International Conference on Liquid Atomization and Spray Systems, Tokyo, Japan, Aug. 27–31, 1978.

* cited by examiner

Primary Examiner—Gregory Wilson
(74) Attorney, Agent, or Firm—Nixon & Vanderhye

(57) ABSTRACT

An apparatus for controlling the emissions of nitrogen oxides from a combustion system includes at least one nozzle assembly having an array of openings for delivering droplets of a fluid chemical agent to a flue gas within the combustion system; a controller operatively coupled to the at least one nozzle assembly for controlling the size and distribution of each droplet; an excitation mechanism operatively coupled to the at least nozzle assembly for providing additional control over the size and distribution of each droplet; and the array of openings arranged for deflecting the droplets to prevent droplet collisions

21 Claims, 5 Drawing Sheets .

METHOD AND APPARATUS FOR REDUCING EMISSION OF NITROGEN OXIDES FROM A COMBUSTION SYSTEM

This invention generally relates to reducing emission of nitrogen oxides from combustion systems. More particularly, the present invention relates to an apparatus for delivering an aqueous solution of a chemical agent to a flue gas for controlling emissions of nitrogen oxides from combustion systems.

BACKGROUND OF THE INVENTION

Reduction of nitrogen emissions from exhaust of flue gases, before their release into the atmosphere, has been a prolific topic of discussion in the field of environmental aspects of energy production by combustion of fuel material. Because nitrogen oxide emissions are related to various environmental problems, the minimizing of nitrogen oxide release from combustion systems is an ongoing concern.

The process for controlling emissions of nitrogen oxides from combustion systems involves externally staged combustion and injection of a chemical agent. This process called advanced reburning can be improved or optimized if the chemical agent is introduced as an aqueous solution, and the sizes of the aqueous droplets are properly controlled. In its simplest form, returning is a process in which the fuel to air ratio in a combustion system is manipulated and controlled to reduce the amount of nitrogen oxides that reach the stack. The reburn process encompasses a combustion process in which the fuel and air are combined in a series of three major sub-processes to reduce the emissions of oxides of nitrogen from a combustion system.

Selective non-catalytic reduction (SNCR) is one approach used for controlling emissions of oxides of nitrogen. In this approach, a chemical agent is added to a combustion system where it reacts with oxides of nitrogen to reduce them to a molecular state. In its original form, SNCR involves the injection of ammonia into a flue gas duct of an air heater. As disclosed in U.S. Pat. No. 3,900,554 to Lyon, the contents of which are incorporated by reference herein. The SNCR technique described in the '554 patent is effective only within a narrow temperature range, requiring that grids of tubing and injection nozzles be installed in the ductwork at different locations so that the location of ammonia injection could be moved in response to changes in combustor operation.

Alternate known approaches use chemical reagents such as, for example, urea and cyanuric acid to reduce emissions of nitrogen oxides from a combustion system. These compounds remained as solids at normal temperature, and thus were difficult to inject into combustion systems. While injection of aqueous solutions simplified the materials handling problems, new challenges were introduced. Key among these was the fact that the droplets require finite time to evaporate. Experimental evidence suggested that very little chemical agent became available for reaction until evaporation of water was completed.

In yet another approach, nozzles were specified and used based on the droplet sizes produced by each nozzle. This technique allowed the urea solution to be injected into the furnace in such a manner that the droplets would evaporate at the point of maximum effectiveness. The SNCR process, however, involves several drawbacks. In simple terms, the chemical agent, be it ammonia, urea, cyanuric acid, or other compounds, had to partially burn or react with oxygen in order to start the chain of events that leads to reduction of oxides of nitrogen. Therefore, a portion of the chemical agent is itself oxidized producing additional oxides of nitrogen.

In SNCR process, a number of intermediate species, known as free radicals, are also produced. These free radicals react with additional chemical agents to create the species that directly react with oxides of nitrogen leading to the production of molecular nitrogen. The SNCR process thus requires a delicate balance between the temperature and the chemical agents that are being introduced to reduce the oxides of nitrogen. If the temperature is just a little bit too high, the chemical burning is too fast, thus producing more oxides of nitrogen than it is able to reduce. If the temperature is just a little bit too low, the chemical agent does not burn fast enough, and not enough of the desired species are produced to permit reduction of oxides of nitrogen. In the latter situation, unreacted or partially reacted chemical agents can escape to the exhaust of the combustion system, and can become pollutants themselves.

The balancing process introduces practical difficulties in that, in some cases, the optimal location for injection of chemical agent is unavailable in a combustion system. In one approach, additional compounds were injected into the combustion system coincidentally with the chemical agent. Injection of these additional compounds produced additional free radicals at lower temperatures through a slow combustion process. These additional free radicals augmented free radicals produced through the burning of the chemical agent. At high temperatures, different compounds were added with the chemical agent. The action of these compounds was to either scavenge free radical species, or to promote the recombination of free radicals to form innocuous compounds such as water and carbon monoxide. In either case, the runaway reactions leading to oxidation of the chemical agents are suppressed and the desired reaction pathways leading to reduction of oxides of nitrogen are promoted.

FIG. 1 compares the effect of temperature on the SNCR process with and without the addition of additional compounds. Specifically, FIG. 1 indicates that by tailoring the overall chemistry of the combustion system 12 (FIG. 2), a certain amount of control may be afforded over the SNCR process, which may then become less sensitive to temperature.

Other approaches combined features of reburn technology and SNCR to produce a new process known as advanced reburning. In its simplest form, advanced reburning is a combination of reburn and SNCR, wherein the SNCR agent is added either with the reburn fuel or the overfire air. In advance reburning process, the chemical agent may be a well-known SNCR chemical agent, or may be another chemical compound, or mixture of compounds with similar chemical properties. Examples of chemical agents introduced into this advance reburning process include ammonium sulfate and ferrous ammonium sulfate.

In order to introduce sprays of aqueous chemical agent into a combustion system, conventional equipment used nozzle assemblies. In one approach, a pressure nozzle is used wherein the liquid behind the nozzle exit is under significant pressure. The pressurized liquid leaves the nozzle in a thin sheet that subsequently breaks down into filaments and ligaments eventually forming droplets. Another approach adopted a twin fluid nozzle wherein a supply of a second fluid, usually a gas such as, for example, air, is pressurized behind the nozzle. As the gas expands and accelerates across the nozzle it forms a momentum boundary layer across the surface of the liquid. Shear forces in this boundary layer transfer momentum from the gas to the liquid, resulting in surface instabilities that create droplets. In both these approaches, the geometry of the nozzle dictates the size distribution of the droplets produced. In a twin fluid nozzle some control over the droplet size distribution can be achieved by varying the pressure of the second fluid. In general, the average drop size is larger than the design drop size for fluid pressures below the design pressure. Also, increasing the average drop size tends to result in broadening the overall drop size distribution, and a significant fraction of the fine droplets continue to be produced.

Thus, with conventional equipment for introducing sprays of aqueous solutions of chemical agents into a combustion system, there will be a broad range of drop sizes, with a significant fraction of the droplet population being quite small and susceptible to evaporation in a very short time frame. This makes control over the droplet evaporation time difficult, and reduces the effectiveness of the droplet injection process.

SUMMARY OF THE INVENTION

Accordingly, an apparatus and method for delivering an aqueous solution of a chemical agent to a flue gas within a combustion system, while controlling the size and distribution of aqueous droplets. The method and apparatus reduces the emissions of nitrogen oxides from combustion system by injecting a fluid chemical agent to a flue gas within the combustion system. The apparatus includes at least one nozzle assembly having an array of openings. The nozzle assembly design is based on the Raleigh-Weber phenomenon, and produces fluid droplets with an average droplet size and narrow size distribution that is advantageous for the advanced reburning process by injecting the chemical agent(s) into overfire air in the combustion system. A fluid flow controller is used to control fluid parameters such as, for example, flow rate, pressure, thereby controlling the diameter of fluid droplets issuing from the nozzle.

An excitation mechanism is also provided to vibrate the nozzle assembly or acoustically excite the fluid being delivered to the nozzle assembly. The excitation mechanism provides additional control over the average droplet size and distribution. The openings of the nozzle may be arranged in linear, circular or elliptical fashion to eliminate the possibility of droplet collisions which may lead to agglomeration of fluid droplets.

The formation of fluid droplets is represented by the following equation (referred to as Raleigh-Weber equation):

$$D = 1.89 D_j \left[ 1 + \frac{3\mu_l}{(\sigma \rho_l D_j)^{1/2}} \right]$$

where,

D=droplet diameter $D_j$=jet diameter $\mu_l$=liquid viscosity $\rho_l$=liquid density σ=liquid surface tension In one aspect, the apparatus for controlling the emissions of nitrogen oxides from a combustion system includes at least one nozzle assembly having an array of openings for delivering droplets of a fluid chemical agent to a flue gas within the combustion system; a first controller operatively coupled to the at least one nozzle assembly for controlling the size and distribution of each droplet; a second controller operatively coupled to the at least nozzle assembly for providing additional control over the size and distribution of each droplet; and the array of openings arranged for deflecting the droplets to prevent droplet collisions. The array openings are preferably disposed in a circular arrangement. The array openings may also be disposed in a linear or an elliptical arrangement. Preferably, the longitudinal axes of the openings are aligned to prevent the velocity vectors of the fluid issuing from the nozzle from intersecting. Droplet from the array of openings preferably exit in a divergen pattern to prevent droplet collisions. The apparatus further includes a delivery system for supplying fluid to the array of openings, the delivery system designed to generate a velocity vector of the fluid approaching each opening to be normal to the surface of a respective opening. The amount of fluid delivered through each opening of the array is approximately equal for openings of equal diameter. Preferably, the diameter of each droplet is in the range of 100–1200 microns. The diameter of the droplets is controlled by the Raleigh-Weber equation as noted above. The second controller may be a frequency controller.

In another aspect, apparatus for controlling the emissions of nitrogen oxides from combustion systems comprising at least one nozzle assembly having an array of openings for delivering droplets of a fluid chemical agent to the combustion system, the openings being arranged to prevent droplet collisions, and wherein the diameter of each droplet is controlled by the Raleigh-Weber equation. A controller is operatively coupled to the at least one nozzle assembly for exciting the fluid delivered to the nozzle and providing additional control over the droplet size and distribution.

In another aspect, in a gas turbine of the type having an combustor, at least one nozzle assembly having an array of openings, a method for controlling the emissions of nitrogen oxides from the combustor, comprises arranging the openings of the array to prevent droplet collisions; delivering droplets of fluid chemical agent to the combustor; controlling the fluid delivered to each nozzle; and exciting the fluid delivered to the at least one nozzle for controlling the droplet size and distribution. The method further includes aligning longitudinal axes of the openings to prevent the velocity vectors of the liquid issuing from each opening from intersecting. Also, fluid is delivered to each opening so as to make the velocity vector of the fluid approaching each opening normal to the surface of a respective opening. The volume of fluid delivered through each opening of the array is approximately equal for openings of equal diameters.

In a further aspect, a method for controlling the emissions of nitrogen oxides from a combustion system including arranging the openings of a nozzle to prevent droplet collisions; controlling the fluid delivered to the nozzle; exciting the fluid delivered to the nozzle for controlling the droplet size and distribution; and delivering droplets of fluid chemical agent to the combustion system.

DETAILED DESCRIPTION OF THE INVENTION

Figure 1:
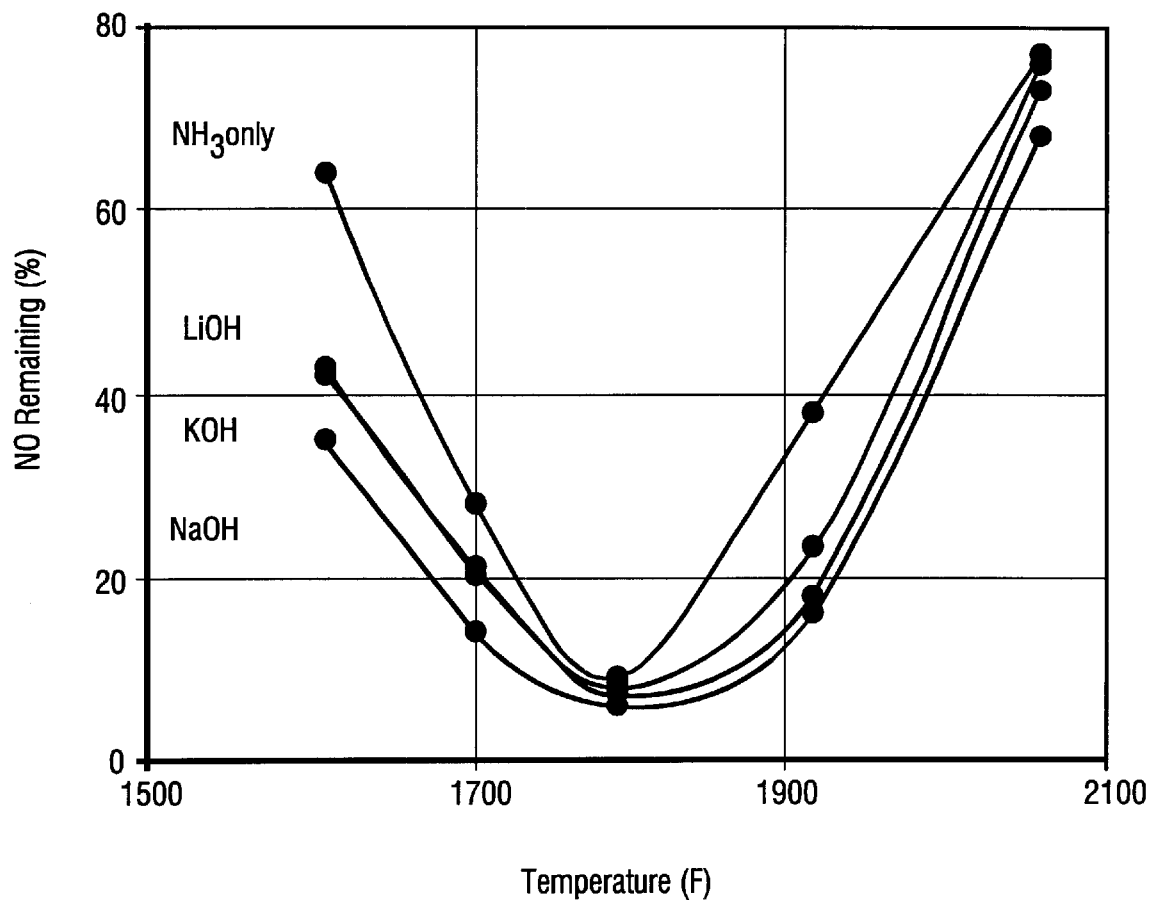
FIG. 1 compares the effect of temperature on the SNCR process with and without addition of additional compounds.
Figure 2:
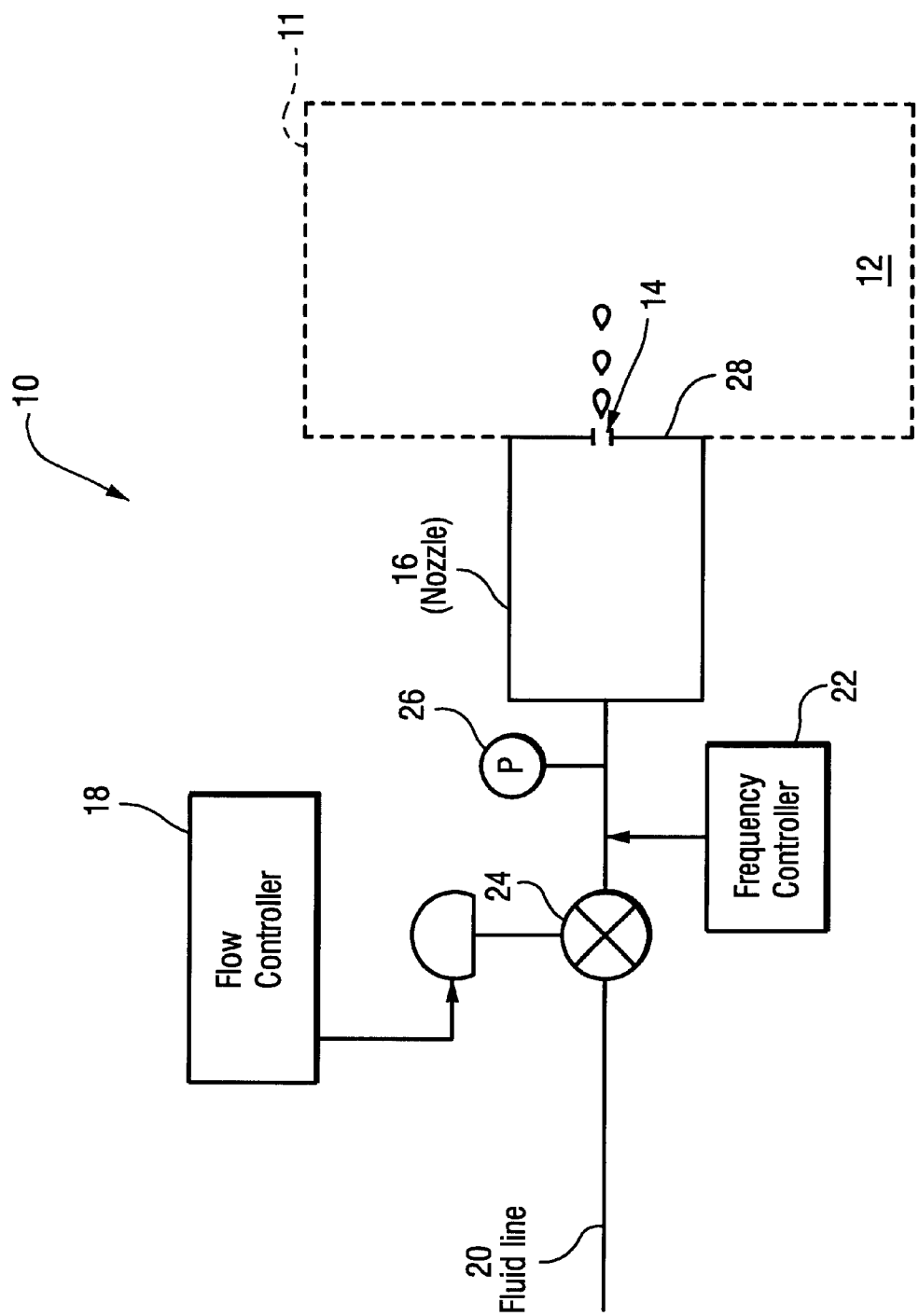
FIG. 2 is a side schematic view of apparatus having a nozzle assembly and flow controllers according to the present invention.
Figure 3:
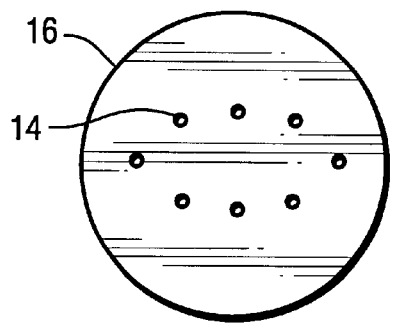
FIGS. 3–5 illustrate a cross-sectional view of nozzle openings in various configurations.
Figure 4:
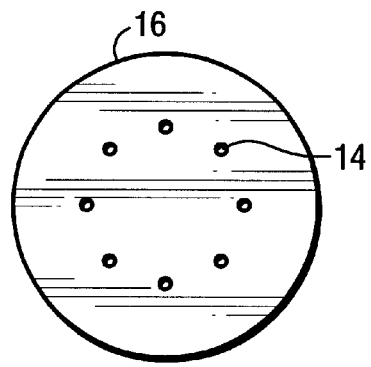
Figure 5:
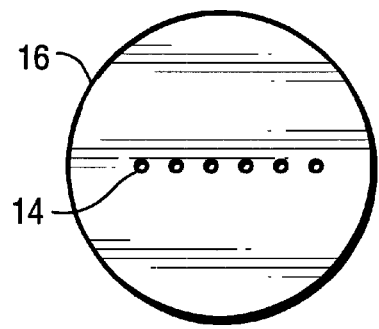
Figure 6:
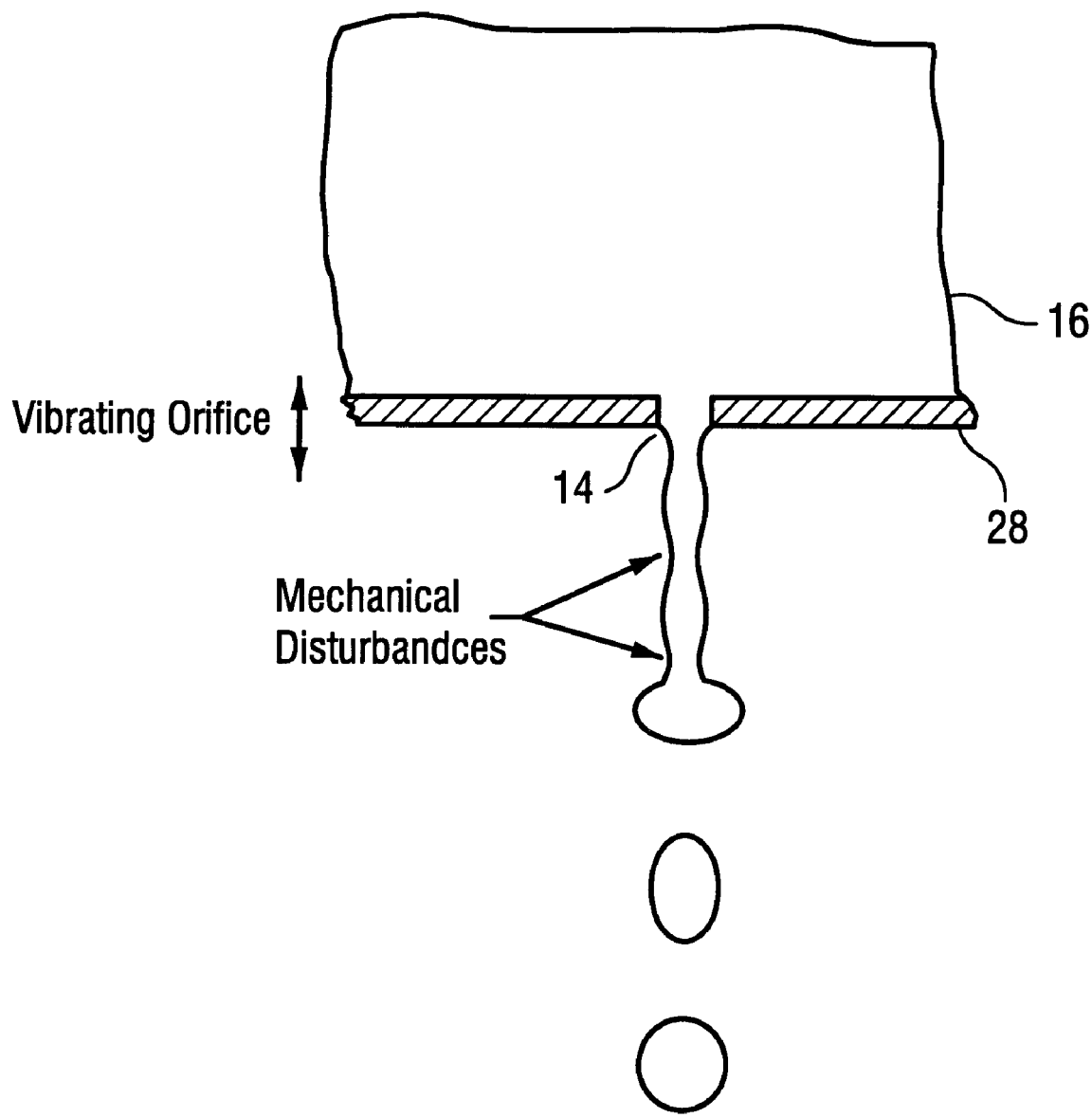
FIG. 6 illustrates another embodiment of the present invention wherein a vibrating orifice is provided for affording additional control over droplet size and distribution.
Figure 7:
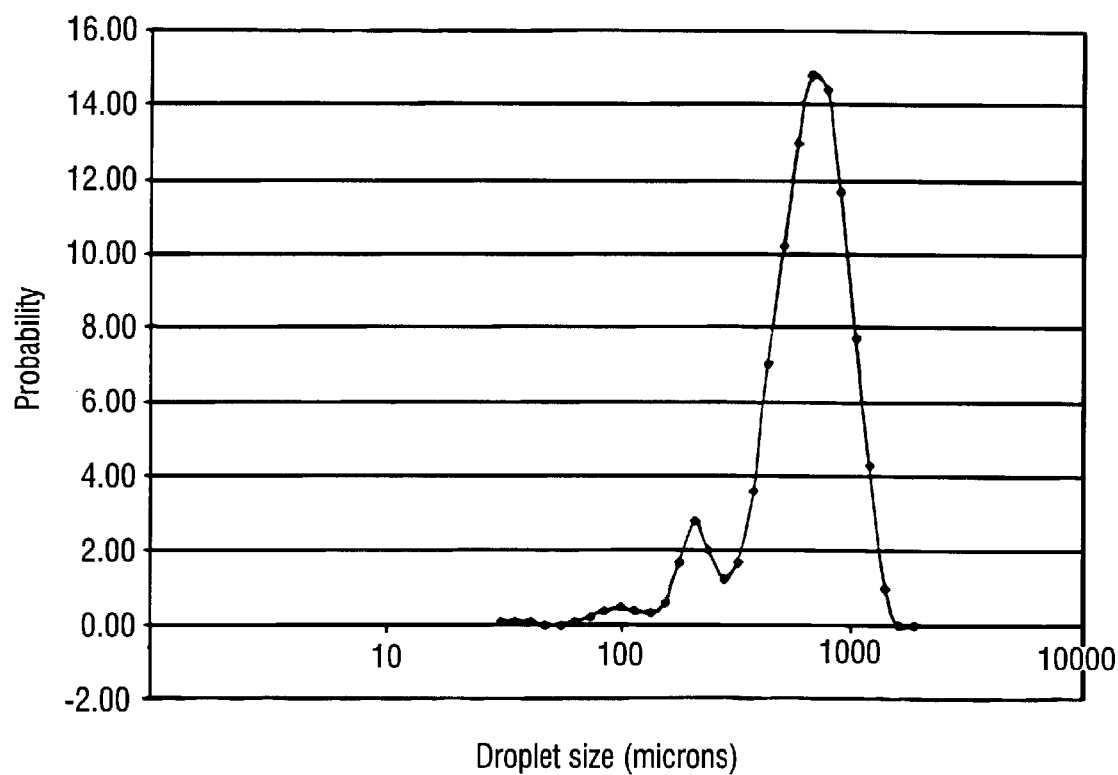
FIG. 7 shows the exemplary results of drop size measurements for the nozzle assembly of FIG. 1 wherein the nozzle openings are arranged in an elliptical pattern with the longitudinal axes arranged in a parallel fashion.

Referring now to FIG. 2, there is shown a side schematic view of apparatus 10 for reducing the emissions of nitrogen oxides from combustion system 12. This embodiment includes a nozzle assembly 16 for injecting aqueous fluid chemical agent into a combustion system 12 of a gas turbine engine 11. A single nozzle assembly 16 is illustrated in the embodiments of FIG. 2. Several such nozzle assemblies may be disposed to inject an aqueous chemical agent to a combustion system 12. Each such nozzle assembly may be provided with a flow controller 18 and an excitation controller 22. Aqueous chemical agent carried by fluid line 20 is delivered in the form of fluid droplets to combustion system 12 to reduce the emissions of nitrogen oxides produced during combustion process. The volume of the fluid delivered to the nozzle assembly 16 is controlled by flow controller 18.

The flow controller 18 cooperatively functions with flow restrictor 24 to control the amount of fluid and flow rate of the fluid delivered to nozzle assembly 16. The fluid line 20 is further provided with a pressure tap 26 to adjust fluid pressure. The flow rate and the pressure of the fluid delivered to nozzle assembly 16 is controlled to produce fluid droplets of desired diameter and distribution, thus affording control on the fluid droplets injected into the combustion system 12. The formation of fluid droplets in the nozzle is described by the Raleigh-Weber equation given by:

$$D = 1.89 D_j \left[ 1 + \frac{3\mu_l}{(\sigma \rho_l D_j)^{1/2}} \right]$$

where,

D=droplet diameter
$D_j$=jet diameter
$\mu_1$=liquid viscosity
$\rho_1$=liquid density
$\sigma$=liquid surface tension Care should be taken to control the properties of the fluid to keep fluid reagents in solution until a droplet is near or at complete evaporation point. This would be especially important if the evaporation temperature of a reagent is lower than the evaporation temperature of the fluid carrying the reagent. Therefore, it is possible that the a reagent may start evaporating once the fluid droplet has reached the reagent boiling point. Fluid additives, such as for example, surfactants that change the surface tension, thus the properties of a fluid. Also, different carrier fluids having lower boiling points than the boiling point of reagents may be used. The flow controller may be used to timely release the fluid droplet depending on the surface tension effects of the droplet. Therefore, the selection of reagents and fluid medium to accomplish rapid release of reagents at a spatial location within a combustion system should be governed by the properties of the fluid and the process conditions.

Experimental observations indicate that the average size of a droplet decreases with increasing jet velocity beyond a critical velocity necessary to induce coherent droplet formation. As the liquid velocity and flow rate are further increased, the droplet size distribution broadens with both very large and moderately small droplets being generated.

The excitation controller 22 is operatively coupled to the fluid line 20 to provide additional control over the size and distribution of droplets generated by the nozzle assembly 16. The excitation controller may be, for example, a frequency controller. Any apparatus for vibrating the nozzle assembly 16 or acoustically exciting the fluid being delivered to the nozzle assembly 16 to provide additional control over the average droplet size and distribution may be used. For example, a vibrating plate or disk 28 (FIG. 6) having orifices may be provided for additional control over the size and distribution of fluid droplets issuing from nozzle 16.

The fluid issuing from the nozzle assembly 16 may be acoustically stimulated at a frequency corresponding to the desired droplet diameter independent of the preferred diameter described by the Raleigh-Weber equation as set forth above. This additional stimulation/excitation of the fluid droplets overrides the natural breakup mechanism dictated by the Raleigh-Weber equation. This additional stimulation by frequency controller 22 may be used to further change the size of the droplets issuing from nozzle assembly 14 to within about a factor of two from the preferred diameter without changing the liquid velocity (i.e., flow rate) by flow controller 18.

Fluid line 20 delivers fluid to nozzle assembly 16, the nozzle assembly having an array of openings 14 which may be, for example, small holes, hollow tubes, needles, or annuli, in a plate or disk. The array of openings 14 may be arranged, for example, in linear, circular, multiple concentric circles, or elliptical arrangement, to prevent droplet collisions and agglomeration. The arrangement of the openings need not be limited to circular or elliptical configurations. Any means well known to one experienced in the art may be provided to deflect the drops as they are formed to achieve a better spatial distribution and avoid collisions between drops that could otherwise lead to agglomeration and formation of large drops. The longitudinal axes of openings 14 are preferably aligned so that the velocity vectors of the fluid droplets issuing from nozzle 16 do not intersect. Fluid line 20 delivers fluid to nozzle openings 14 such that the velocity vector of the fluid approaching each opening 14 is approximately normal to the surface of a respective opening, and that the volume of fluid delivered through each opening 14 is approximately equal for openings of equal size. It will be appreciated that openings 14 may be disposed such that fluid droplets exit in a divergent pattern to adjacent openings in order to prevent droplet collisions. For example, end plate 28 of nozzle 16 may be of a convex surface configuration and openings 14 may be disposed normal to the convex surface so that adjacent openings are diverging.

FIGS. 3–5 depict the array of openings 14 of nozzle 16 in an elliptical, circular, and linear configurations.

Referring now to FIG. 6, nozzle 16 is provided with a vibrating orifice 28 for affording additional control over the size and distribution of fluid droplets issuing out of nozzle 16.

Referring now to FIG. 7, there is shown the results of drop size measurements for an ellpitical arrangment of nozzle openings with parallel longitudinal axes for the nozzle shown in FIG. 6. The drop size distribution is not log normal, but have characteristic satellite peaks of smaller drops, and is relatively narrow. The mean drop size is approximately 600 $\mu$m, and drop size distribution has a distinct lower bound that is not normally achievable with either twin-fluid or conventional pressure atomization nozzles. The total mass fraction of drops below 100 $\mu$m diameter is approximately 0.015 and the total mass fraction of drops above 1200 $\mu$m is approximately 0.01.

Although the present invention is described to reduce emissions of nitrogen oxides from a combustion system by delivering fluids and controlling the evaporation location and placement of chemical reagents within the combustion system, it will be appreciated that the inventive concept may be applied to boiler systems, specifically to electric utility gas boilers and oil & coal-fired boilers, and ammonia prilling tower systems.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An apparatus for controlling the emissions of nitrogen oxides from a combustion system, comprising:
    at least one nozzle assembly having an array of openings for delivering droplets of a fluid chemical agent to a flue gas within the combustion system;
    a first controller operatively coupled to said at least one nozzle assembly for controlling the size and distribution of each droplet;
    a second controller operatively coupled to said at least nozzle assembly for providing additional control over the size and distribution of each droplet; and
    said array of openings arranged for deflecting the droplets to prevent droplet collisions.

2. The apparatus of claim 1 wherein said openings are disposed in a circular arrangement.

3. The apparatus of claim 1 wherein said openings are disposed in an elliptical arrangement.

4. The apparatus of claim 1 wherein said openings are disposed in a linear arrangement.

5. The apparatus of claim 1 wherein longitudinal axes of said openings are aligned to prevent the velocity vectors of the fluid issuing from the nozzle from intersecting.

6. The apparatus of claim 1 wherein droplets from said array of openings exit in a divergent pattern to prevent droplet collisions.

7. The apparatus of claim 1 further comprises:
    a delivery system for supplying fluid to the array of openings, said delivery system designed to generate a velocity vector of the fluid approaching each opening to be normal to the surface of a respective opening.

8. The apparatus of claim 7, wherein the amount of fluid delivered through each opening of the array is approximately equal for openings of equal diameter.

9. The apparatus of claim 1 wherein the diameter of each droplet produced from said openings is in the range of 100–1200 microns.

10. The apparatus of claim 1 wherein the diameter of the droplets is controlled by the equation:

$$D = 1.89 D_j \left[ 1 + \frac{3\mu_l}{(\sigma \rho_l D_j)^{1/2}} \right]$$

where,

D=droplet diameter $D_j$=jet diameter $\mu_l$=liquid viscosity $\rho_l$=liquid density σ=liquid surface tension.

11. The apparatus of claim 1 wherein said second controller is a frequency controller.

12. An apparatus for controlling the emissions of nitrogen oxides from combustion systems, comprising:

at least one nozzle assembly having an array of openings for delivering droplets of a fluid chemical agent to said combustion system, said openings being arranged to prevent droplet collisions, and wherein diameter of each droplet is controlled by the equation:

$$D = 1.89 D_j \left[ 1 + \frac{3\mu_l}{(\sigma \rho_l D_j)^{1/2}} \right]$$

where,

D=droplet diameter $D_j$=jet diameter $\mu_l$=liquid viscosity $\rho_l$=liquid density σ=liquid surface tension; and a controller operatively coupled to said at least one nozzle assembly for exciting the fluid delivered to the nozzle and providing additional control over the droplet size and distribution.

13. A method for controlling the emissions of nitrogen oxides from a combustion system, comprising:
    arranging the openings of a nozzle to prevent droplet collisions;
    controlling the fluid delivered to the nozzle;
    exciting the fluid delivered to the nozzle for controlling the droplet size and distribution; and
    delivering droplets of fluid chemical agent to the combustion system.

14. In a gas turbine of the type having a combustor, at least one nozzle assembly having an array of openings, a method for controlling the emissions of nitrogen oxides from the combustor comprising:
    arranging the openings of said array to prevent droplet collisions;
    controlling the fluid delivered to each nozzle;
    exciting the fluid delivered to said at least one nozzle for controlling the droplet size and distribution; and
    delivering droplets of fluid chemical agent to the combustor.

15. The method of claim 14 wherein said array of openings are disposed in a circular arrangement.

16. The method of claim 14 wherein said array of openings are disposed in an elliptical arrangement.

17. The method of claim 14 further comprising:
    aligning longitudinal axes of said openings to prevent the velocity vectors of the liquid issuing from each said opening from intersecting.

18. The method of claim 17 further comprises:
    delivering fluid to each said opening to make the velocity vector of the fluid approaching each said opening normal to the surface of a respective opening.

19. The method of claim 18, wherein the volume of fluid delivered through each opening of the array is approximately equal for openings of equal diameters.

20. The method of claim 14 wherein the diameter of each droplet is in the range of 100–1200 microns.

21. The method of claim 14 wherein the diameter of each droplet is controlled by the equation;

$$D = 1.89 D_j \left[ 1 + \frac{3\mu_l}{(\sigma \rho_l D_j)^{1/2}} \right]$$

where, $D$=droplet diameter $D_j$=jet diameter $\mu_l$=liquid viscosity $\rho_l$=liquid density $\sigma$=liquid surface tension.

* * * * *

UNITED STATES PATENT AND TRADEMARK OFFICE
CERTIFICATE OF CORRECTION

PATENT NO.     : 6,474,271 B1
DATED          : November 5, 2002
INVENTOR(S)    : Widmer et al.

It is certified that error appears in the above-identified patent and that said Letters Patent is hereby corrected as shown below:

Column 1,
Line 26, kindly delete "returning is a process" and insert -- reburning is a process -- therefor.

Column 6,
Line 55, kindly delete "ellpitical" and insert -- elliptical -- therefor Signed and Sealed this Eighth Day of April, 2003

JAMES E. ROGAN
*Director of the United States Patent and Trademark Office*